US012559032B2

(12) United States Patent
Hoffmann et al.

(10) Patent No.: US 12,559,032 B2
(45) Date of Patent: Feb. 24, 2026

(54) MONITORING SYSTEM FOR A VEHICLE

(71) Applicant: Bayerische Motoren Werke Aktiengesellschaft, Munich (DE)

(72) Inventors: Philipp Hoffmann, Hannover (DE); Mark Riebe, Kranzberg (DE); Jasper Stern, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 43 days.

(21) Appl. No.: 18/564,348

(22) PCT Filed: May 2, 2022

(86) PCT No.: PCT/EP2022/061650
§ 371 (c)(1),
(2) Date: Nov. 27, 2023

(87) PCT Pub. No.: WO2022/248160
PCT Pub. Date: Dec. 1, 2022

(65) Prior Publication Data
US 2024/0262290 A1 Aug. 8, 2024

(30) Foreign Application Priority Data
May 28, 2021 (DE) ..................... 10 2021 113 893.0

(51) Int. Cl.
B60R 1/22 (2022.01)
(52) U.S. Cl.
CPC .......... B60R 1/22 (2022.01); B60R 2300/205 (2013.01); B60R 2300/8046 (2013.01)

(58) Field of Classification Search
CPC ....... B60R 1/00; B60R 1/22; B60R 2300/205; B60R 2300/8046; B60R 2300/70; B60R 2300/80; B60R 2300/802; B60R 11/04; B60R 2001/1215; B60R 11/0235; B60R 2011/0276; B60K 2370/176;
(Continued)

(56) References Cited

U.S. PATENT DOCUMENTS 9,599,816 B2 * 3/2017 Kuzuhara .............. G03B 21/28
11,221,480 B2 * 1/2022 Hirata ................ G02B 17/0605
(Continued)

FOREIGN PATENT DOCUMENTS

DE 10 2015 113 039 A1 2/2017
DE 10 2017 005 040 A1 11/2017
(Continued)

OTHER PUBLICATIONS

International Search Report (PCT/ISA/210) issued in PCT Application No. PCT/EP2022/061650 dated Sep. 7, 2022 (2 pages).
(Continued)

*Primary Examiner* — Nathnael Aynalem
(74) *Attorney, Agent, or Firm* — Crowell & Moring LLP

(57) ABSTRACT

A monitoring system for a vehicle includes a camera mounted on the exterior of the vehicle, a display device mounted in an interior space of the vehicle, and a control device that presents an image scanned by the camera on the display device. The display device comprises a screen and a reflective element that presents to a person on-board the vehicle an image that appears at a point which intersects an optical axis of the camera.

11 Claims, 3 Drawing Sheets

(58) Field of Classification Search
CPC ........ B60K 2370/1868; B60K 2370/21; B60K 2370/52; B60K 2370/797; B60K 35/00; B60K 2370/152; B60K 2370/1526; B60K 2370/1529; B60K 2370/1531; B60K 2370/1533; B60K 2370/736; B60K 2370/739; H04N 7/181; G02B 27/01; G02B 27/0093; G05B 2219/35503; G06F 3/012; B60W 2050/146
USPC .......................................................... 348/148
See application file for complete search history.

(56) References Cited

U.S. PATENT DOCUMENTS

| | | | | |
|---|---|---|---|---|
| 2010/0073773 A1* | 3/2010 | Hotta | ..................... | G02B 27/01 |
| | | | | 359/630 |
| 2014/0104424 A1* | 4/2014 | Zhang | ..................... | G06T 3/047 |
| | | | | 348/148 |
| 2016/0320624 A1* | 11/2016 | Yamaoka | ............... | B60K 35/50 |
| 2017/0043719 A1* | 2/2017 | Wippler | ................... | B60R 1/26 |
| 2017/0225621 A1 | 8/2017 | Shiohara | | |
| 2018/0120572 A1* | 5/2018 | Watanabe | ........... | B60K 35/234 |
| 2021/0271076 A1* | 9/2021 | Ono | ....................... | B60K 35/50 |

FOREIGN PATENT DOCUMENTS

| | | |
|---|---|---|
| EP | 2 351 668 A2 | 8/2011 |
| JP | 2008-141574 A | 6/2008 |
| JP | 2019-177726 A | 10/2019 |

OTHER PUBLICATIONS

German Search Report issued in German Application No. 10 2021 113 893.0 dated Nov. 9, 2021, with partial English translation (7 pages).

* cited by examiner

MONITORING SYSTEM FOR A VEHICLE

This application is a 371 of International Application No. PCT/EP2022/061650, filed May 2, 2022 which claims priority under 35 U.S.C. § 119 from German Patent Application No. 10 2021 113 893.0, filed May 28, 2021, the entire disclosure of which is herein expressly incorporated by reference.

BACKGROUND AND SUMMARY

The present invention relates to a monitoring system for a vehicle. In particular, the invention relates to a monitoring system for replacing an outside mirror of the vehicle.

A vehicle comprises an outside mirror to provide a driver with information about events located laterally behind the vehicle. The outside mirror may be replaced by a monitoring system comprising a camera and an electronic visual display. The camera is attached to an external side of the vehicle, and the electronic visual display is attached in an interior. This yields additional freedoms of design when placing the camera; moreover, it is possible to implement functions such as a glare protection or a contrast enhancement.

With regards to the placement of the electronic visual display, it is necessary to observe numerous restrictions which may arise from structural conditions in the vehicle, the placement of other control or display elements, or legal requirements. Although the camera can be placed independently of the placement of the monitor, numerous specifications need to be considered in this case, too. For example, the camera should be located outside of a region subject to spray, provide an unobstructed view of the region located laterally behind the vehicle, and be placed advantageously from an aerodynamic point of view.

As a result, the camera and electronic visual display may be placed relative to one another in such a way that it becomes difficult for a driver to correctly relate, in terms of position and perspective, an image of the camera reproduced by means of the electronic visual display to the vehicle. For example, this may lead to a wrong assessment with regards to the distance or speed of another vehicle approaching from behind. A position in relation to or distance from an obstacle may be misinterpreted when maneuvering the vehicle. A risk of an accident may be increased.

An object addressed by the present invention is therefore that of specifying an improved monitoring system for a vehicle.

According to a first aspect of the present invention, a monitoring system for a vehicle comprises a camera to be attached to the exterior of the vehicle; a display apparatus attached in an interior of the vehicle; and a control apparatus for displaying an image scanned by means of the camera on the display apparatus. In this case, the display apparatus comprises an electronic visual display and a reflection element in order to display an image for a person on board the vehicle, with the image appearing at a location that intersects an optical axis of the camera.

The person may be a driver of the vehicle in particular and the camera is preferably configured to scan a region located laterally behind the vehicle. Conventionally, the camera is placed on a left or right vehicle external side. The camera is preferably located in front of the head of the person in the longitudinal direction of the vehicle. The optical axis of the camera corresponds to the optical axis of a lens system used thereby and can be extended toward the front in the direction of travel by the camera. If the camera is situated on the left side of the vehicle, then the display apparatus is preferably configured to be assembled to the left of the person; if the camera is situated on the right side of the vehicle, then the display apparatus is preferably attached to the right of the person in the interior of the vehicle.

The reflection element can be a combiner known from head-up display technology. The combiner is preferably partly transparent, with the result that it overlays or combines two images or projections arriving from different directions in a third direction. The use of the reflection element may lead to the image perceivable by the person appearing uniform to the person in terms of the position of the image and the perspective on which the image is based. This can create an ergonomic situation known from a conventional outside mirror. The person is able to intuitively perceive an object located laterally behind the vehicle better and can better estimate the size, speed and position thereof in relation to the vehicle.

It is further preferable for the reflection element to be designed and arranged such that a distance of an image plane of the image from the person is greater than a distance between the person and the reflection element. The position and distance of the image plane is determined by optical properties of the reflection element or other elements involved in the projection of the image for the person. In this way, the image may appear to be further away from the person than an actual distance between the person and the reflection element. The apparent distance between the person and the image is also referred to as virtual distance. If the person is situated on a left-hand side of the vehicle, the virtual distance to the image of a left-hand monitoring system may be approx. 1.10 to 1.40 meters. The virtual distance to an image of a right-hand camera system can be approx. 1.8 to 2 meters.

As a result of the increased virtual distance, the person is able to better observe a surround of the vehicle directly through a window and perceive information presented by means of the image. Changing between the observation of a distant object and the observation of the provided image might not require accommodation of the eyes of the person. This can significantly reduce a reaction time with regards to presented information. Experiments have shown an acceleration by approx. 0.9 seconds.

The electronic visual display of the monitoring system is preferably located away from a direct connection between the person and the camera. The described presentation of the image for the person, which is adapted to the position and the perspective of the camera, can be realized according to the invention without the electronic visual display for the person being aligned with the camera. This allows for an improved placement of the display apparatus in the vehicle. Thus, an improved monitoring system can be provided, especially in a vehicle with many restrictions in relation to the placement of the display apparatus.

It is further preferable for the reflection element to be curved. In particular, the curvature can be concave from a direction of the electronic visual display. This can realize the effect of the image virtually remote from the person or the display system.

It is further preferable for the reflection element to be aspherically curved. The aspheric curvature can cause an image axis of the image perceivable by the person to be laterally offset. The geometry of the reflection element can be determined by means of ray tracing. To this end, real and desired beam paths can be simulated by means of a computer program, in particular by means of ray tracing methods, and the shape of the reflection element can be determined such that a desired lateral offset and/or increased virtual distance of the image arises.

Both the increased virtual distance and the lateral offset of the image can also be realized, in part or in full, by the control apparatus. By way of example, a pincushion or barrel effect-type geometric distortion can be applied to a scan performed by means of the camera and output on the electronic visual display. Then, the reflection element need no longer be shaped accordingly in order to bring about this distortion. Thus, one or both of the above-described effects can each be replaced, in part or in full, by program code.

It is further preferable for a center of the image perceivable by the person to be located on the optical axis of the camera. As a result, the person can orient themselves optimally with respect to the depicted image and intuitively comprehend an image alignment.

In an embodiment, the image is located between an optical lens and a scanning plane in the longitudinal direction of an optical axis of the camera. The optical lens may comprise a refractive element located furthest away counter to the direction of travel of the vehicle. An optical sensor of the camera may be located in the scanning plane. Should the optical axis of the camera not be straight, for example because a mirror or a prism is located in the beam path, then appropriate length relationships should be assumed as if the axis were straight.

In this case, the virtual image perceivable by the person preferably intersects the optical axis. A distance of the virtual image from the camera can thus be minimized, with the result that perspectives of the perceived image and of the depicted image content can correspond to one another in improved fashion.

In a further embodiment, the image intersects a focus of the camera. The focus of the camera may correspond to a focus of the lens system in the camera. The reflection element, the electronic visual display, or the entire display apparatus can be designed to be pivotable within predetermined limits, in order to be able to be adapted to persons of different size.

In yet a further preferred embodiment, a further reflection element is located in the beam path between the electronic visual display and the reflection element. This can increase an optical distance between the electronic visual display and the reflection element without dimensions of the display apparatus being increased. The display apparatus can be compact and positioned inconspicuously at an advantageous location in the interior of the vehicle.

Several setups are conceivable with regards to the arrangement of the electronic visual display and the two reflection elements.

In a first variant, the electronic visual display is located below the reflection element and the further reflection element is located offset from the electronic visual display counter to the direction of travel of the vehicle. Thus, the beam path can extend counter to the direction of travel from the electronic visual display to the further reflection element and, from there, to the reflection element in the direction of travel and, further, to the person counter to the direction of travel. Thus, from a perspective from the side of the vehicle, the beam path in the region of the display apparatus may have a Z- or S-shaped extent. The arrangement of the electronic visual display can be advantageous with regards to an electrical connector or the dissipation of heat from the electronic visual display.

In a second variant, the electronic visual display is located above the reflection element and the further reflection element is located below the reflection element. The beam path can extend vertically downward from the electronic visual display to the further reflection element, from there to the reflection element in the direction of travel and, onward, to the person counter to the direction of travel. In this variant, the electronic visual display and the two reflection elements can substantially adjoin one another, with the result that they can more easily be fastened to one another and be designed as a separately manageable unit.

Further arrangements with two reflection elements are also conceivable, for example even those in which the electronic visual display radiates laterally to a direction of travel of the vehicle on the further reflection element.

According to a further aspect of the present invention, a vehicle comprises a monitoring system as described herein. Particularly preferably, two monitoring systems are provided on the vehicle, one configured to monitor a region situated behind the vehicle to the left and one configured to monitor a region located behind the vehicle to the right.

The invention is now described in more detail with reference to the attached drawings, in which:

DETAILED DESCRIPTION OF THE DRAWINGS

Figure 1:
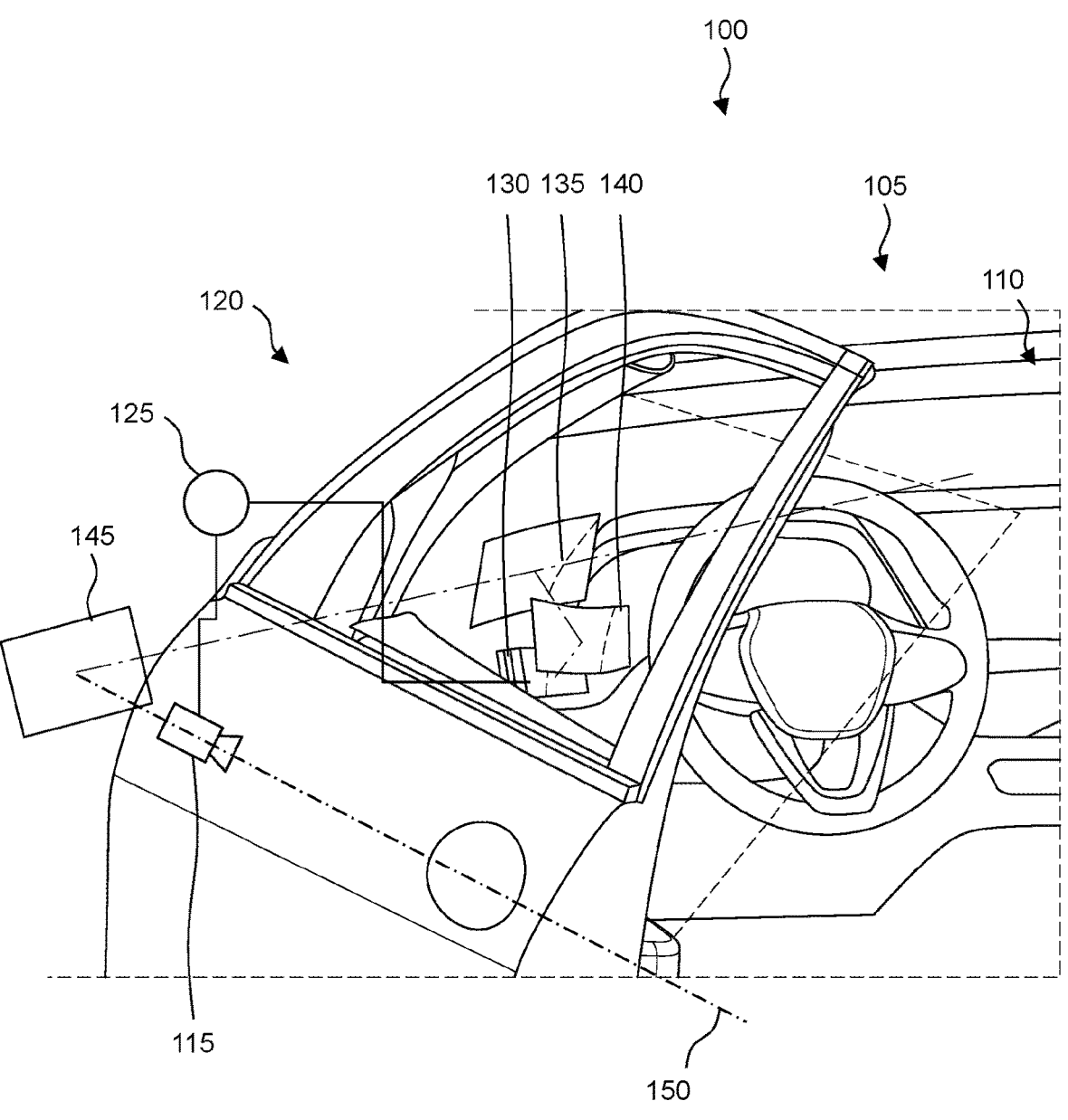
FIG. 1 illustrates a monitoring system on a vehicle in a first embodiment.

FIG. 1 shows a monitoring system 100 on a vehicle 105 in a first embodiment, which may correspond to an above-described first variant. The vehicle 105 preferably comprises a motor vehicle, in particular a motorbike, an automobile, a truck, or a bus. A person 110 is usually located on board the vehicle 105 and, as a driver, may be envisaged to control the vehicle 105.

In the depicted embodiment, the person 110 is situated on a front left seat of the vehicle 105 and the monitoring system 100 is configured to provide the person 110 with a view of a region located to the left behind the vehicle 105. A corresponding monitoring system 100 for the right-hand side may likewise be provided.

The monitoring system 100 comprises a camera 115, a display apparatus 120, and a control apparatus 125. The camera 115 is attached to an exterior of the vehicle 105. The vehicle 105 usually comprises a front window which is delimited laterally by a vehicle column. The camera 115 is usually arranged in the region of a lower end of the vehicle column. In so doing, the camera 115 is preferably situated on a side surface of the vehicle 105. A height above ground or a longitudinal position of the camera 115 can be chosen appropriately on a specific vehicle 105, depending on circumstances present.

The control apparatus 125 is configured to transmit a scan of the surround of the vehicle 105, provided by means of the camera 115, to the display apparatus 120, to display this for the person 110. Adjustments can be carried out in the process. By way of example, additional information can be overlaid or the scan can be adapted geometrically. A color range can be modified or a false color display can be supported.

The display apparatus 120 comprises a monitor 130, a first reflection element 135, and a second reflection element 140.

The monitor 130 is configured to provide a two-dimensional image, which usually consists of a matrix of picture elements. The picture elements are self-luminous and may be realized, for example, on the basis of LCD, LED, micro-LED or OLED. The reflection elements 135 and 140 can each be produced in the style of mirrors, especially surface mirrors. A collimator may be arranged in the beam path between the monitor 130 and the person 110, or one of the reflection elements 135, 140 may form a collimator.

It is particularly preferable here for at least the first reflection element 135 to be curved, and specifically, more preferably, to be aspherically curved, as explained in more detail hereinafter. The display apparatus 120 or at least one of the reflection elements 135, 140 may be attached to be movable through a predetermined range, in order to adapt the optical system of the display apparatus 120 to different positions or proportions of the person 110. In one embodiment, at least one of the reflection elements 135, 140 can be brought into precisely two predetermined positions.

The electronic visual display 130 provides an image 145 which is optionally reflected at the second reflection element 140 and, furthermore, at the first reflection element 135 in order to arrive at the eye of the person 110. For the person 110, the image 145 depicted thus appears to be located in the direction of the first reflection element 135.

On account of the curved shape of the image 145, it is perceived by the person 110 as being located at a greater distance than the distance between them and the first reflection element 135. In particular, the first reflection element 135 is shaped so that the image 145 appears to be located outside of the vehicle 105.

Moreover, as a result of the curvature or arching of the first reflection element 135, the image 145 perceivable by the person 110 is preferably offset laterally or in the height direction. A geometric center of the image 145 is preferably located on an optical axis 150 of the camera 115. In particular, it is preferable for a center of the image 145 to intersect the optical axis 150 of the camera 115.

Figure 2:
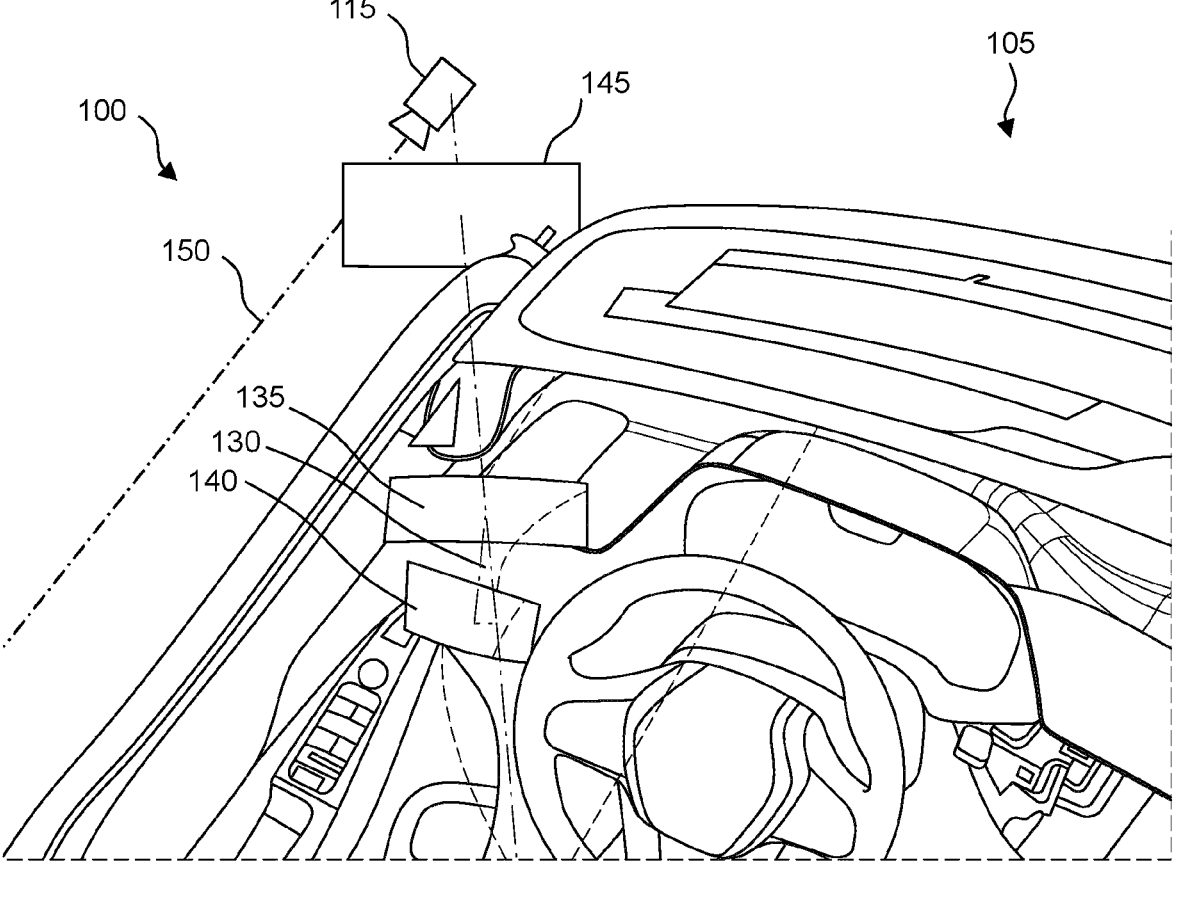
FIG. 2 illustrates the monitoring system of FIG. 1 in a different perspective.

FIG. 2 shows the monitoring system 100 of FIG. 1 in a different perspective. Only selected elements of the monitoring system 100 are plotted here.

It is evident how the image 145 appears in the view of the person 100 to float behind the first reflection element 135.

Figure 3:
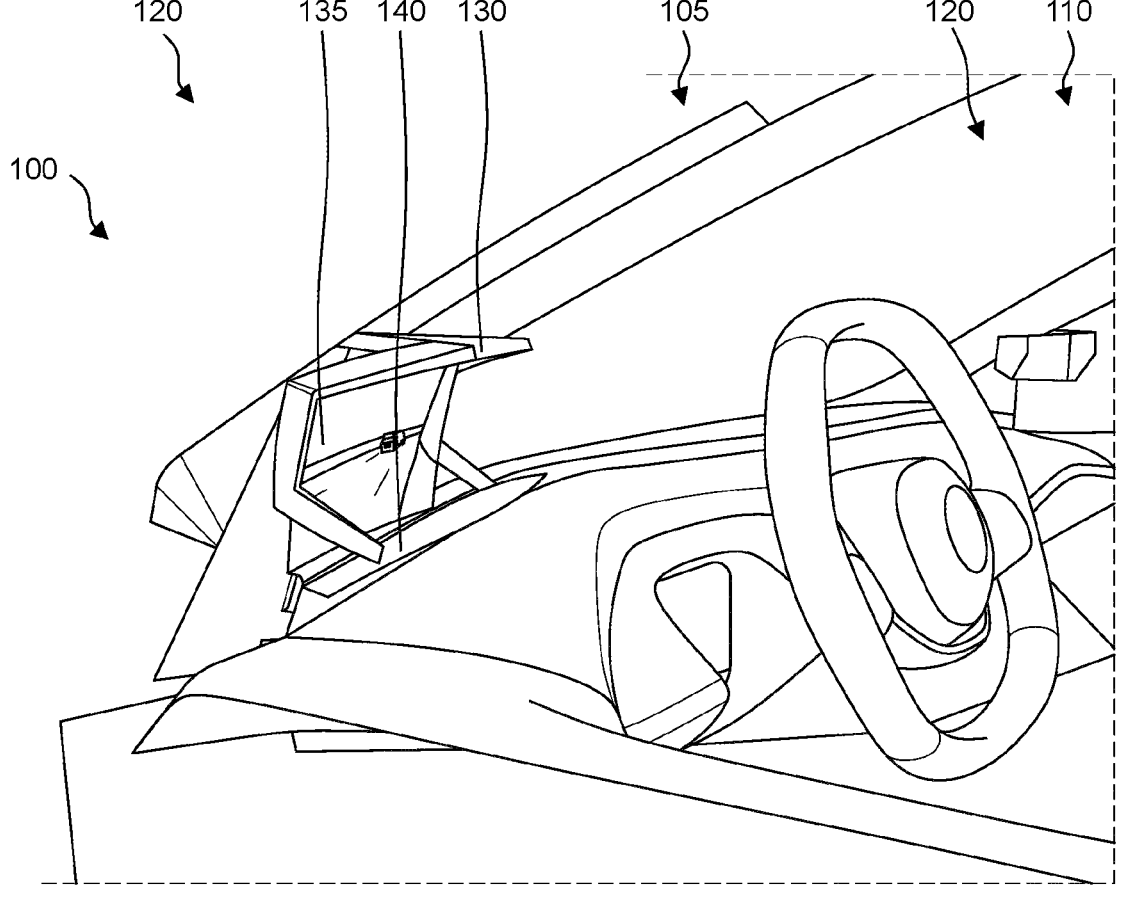
FIG. 3 illustrates a monitoring system on a vehicle in a second embodiment.

FIG. 3 shows a monitoring system 100 on a vehicle 105 in a second embodiment, which may correspond to an above-described second variant. In this case, too, only selected elements of the monitoring system 100 are depicted. A first display apparatus 120 belonging to a left-hand monitoring system 100 is depicted in the foreground; a right-hand display apparatus 120 which may be encompassed by a right-hand monitoring system 100 is visible further to the right.

In the present embodiment, the monitor 130 is located above the first reflection element 135 and radiates vertically downward. The second reflection element 140, which performs a deflection of the provided image onto the first reflection element 135, is located below the first reflection element 135 and has a tilt in the vertical direction.

The first reflection element 135 once again reflects the image in the direction of the person 110. Curvatures, especially in aspherical form, of the first and/or second reflection element 130, 140 bring about an increase in a virtual distance between the person 110 and an image 145 perceivable by the person 110, to beyond the distance from the display apparatus 120 to the person 110. Thus, a person 110 perceiving the image 145 may have the impression of an image 145 floating outside of the vehicle 105. This impression can be particularly convincing if the image 145 for the person 110 is located completely behind a pane, in particular a side window of the vehicle 105.

LIST OF REFERENCE SIGNS

100 Monitoring system
105 Vehicle
110 Person
115 Camera
120 Display apparatus
125 Control apparatus
130 Monitor
135 First reflection element, mirror
140 Second reflection element, mirror
145 Image
150 Optical axis of the camera

What is claimed is:

1. A monitoring system, comprising:
a camera attachable to the exterior of a vehicle;
a display apparatus attachable to an interior of the vehicle; and
a control apparatus that displays an image scanned by the camera on the display apparatus,
wherein the display apparatus includes an electronic visual display and a reflection element that displays the image to a person on-board the vehicle such that the image appears for the person at a location that intersects the optical axis of the camera.

2. The monitoring system of claim 1, wherein a distance of an image plane of the image from the person is greater than a distance between the person and the reflection element.

3. The monitoring system of claim 1, wherein the electronic visual display is not aligned with a line-of-sight between the person and the camera.

4. The monitoring system of claim 1, wherein the reflection element is curved.

5. The monitoring system of claim 4, wherein the reflection element is aspherically curved.

6. The monitoring system of claim 1, wherein a center of the image is located on the optical axis of the camera.

7. The monitoring system of claim 1, wherein the image perceivable by the person is located between an optical lens and a scanning plane in the longitudinal direction of an optical axis of the camera.

8. The monitoring system of claim 1, further comprising:
a further reflection element located in the beam path between the electronic visual display and the reflection element.

9. The monitoring system of claim 8,
wherein the electronic visual display is located below the reflection element, and
wherein the further reflection element is located offset to the electronic visual display counter to the direction of travel.

10. The monitoring system of claim 8,
wherein the electronic visual display is located above the reflection element, and
wherein the further reflection element is located below the reflection element.

11. A vehicle comprising the monitoring system of claim 1.

* * * * *